United States Patent [19]

Hebert

[11] 4,433,464
[45] Feb. 28, 1984

[54] APPARATUS FOR RECLAIMING NAILED BOARDS FROM A BOARD ROAD

[75] Inventor: Francis A. Hebert, Schriever, La.

[73] Assignee: South Louisiana Contractors, Lafayette, La.

[21] Appl. No.: 297,102

[22] Filed: Aug. 28, 1981

[51] Int. Cl.$^3$ .............................................. B23P 19/04
[52] U.S. Cl. ................................. 29/252; 29/564.1; 227/155; 100/913; 414/85
[58] Field of Search ............... 29/564.1, 33 R, 252; 414/82, 85, 68; 100/913; 227/155

[56] References Cited

U.S. PATENT DOCUMENTS

| 461,323 | 10/1891 | Daniels | 414/82 X |
|---|---|---|---|
| 3,143,222 | 8/1964 | Caskie | 414/82 X |
| 3,212,694 | 10/1965 | Sanford | 100/913 X |
| 3,339,390 | 9/1967 | Sommer | 72/133 |
| 3,651,554 | 3/1972 | Herbert | 29/200 |
| 3,760,959 | 9/1973 | Newnes | 214/6 |
| 3,785,277 | 1/1974 | Schmitt | 100/41 |
| 3,855,917 | 12/1974 | Farrell et al. | 100/35 |
| 3,860,128 | 1/1975 | Lunden | 214/6 |
| 3,901,391 | 8/1975 | Carlson et al. | 414/85 X |

Primary Examiner—Frederick R. Schmidt
Assistant Examiner—Steven P. Schad
Attorney, Agent, or Firm—Wilkinson, Mawhinney & Theibault

[57] ABSTRACT

An apparatus for salvaging nailed boards employed in the building of temporary board roads over marsh land. The boards have nails extending from one side thereof which must be bent flush and the boards stacked in bundles for reuse in laying a new board road. The apparatus has at its front end a set of board receiving rolls with their axes along the major axis of the machine for receiving the boards with their major axis transversely of the machine on the rolls with the nail extending upwardly. Co-extensive with the board receiving rolls for advancing the boards edgewise from the front to the rear of the machine are pivoted dog pushers. In advance of the nail bending roll there is provided a pair of barriers for maintaining a single vertical layer of boards. A pair of endless chains are positioned to engage and move boards edgewise rearwardly from the board receiving rolls through the machine. A single large rotary nail bending roll is positioned diagonally across the machine with its rotary axis extending across at least four boards simultaneously is positioned rearwardly of the barriers. A board transfer rod is positioned to receive a group of edgewise boards from the endless chain drive for moving the boards rearwardly of the machine to a board stacking device positioned rearwardly of the nail bending rolls for receiving the boards from the transfer rods to stack the boards for reuse.

7 Claims, 12 Drawing Figures

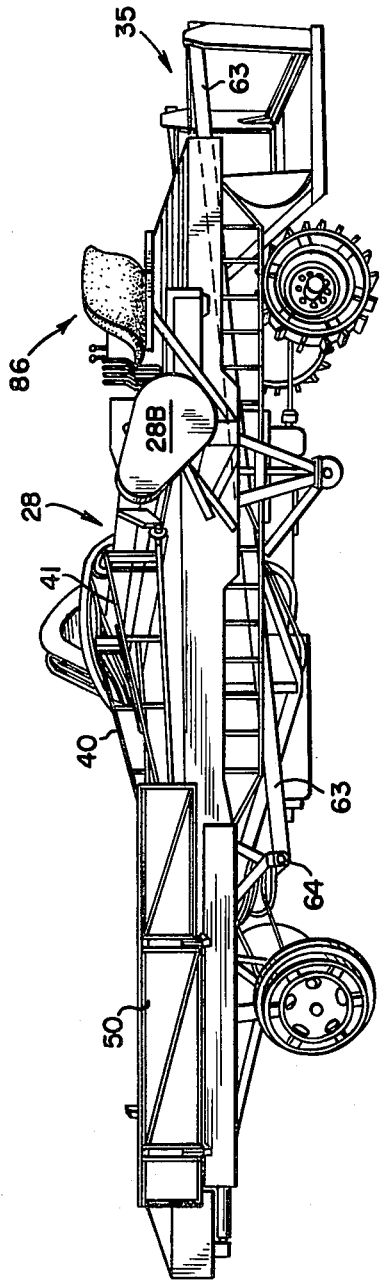
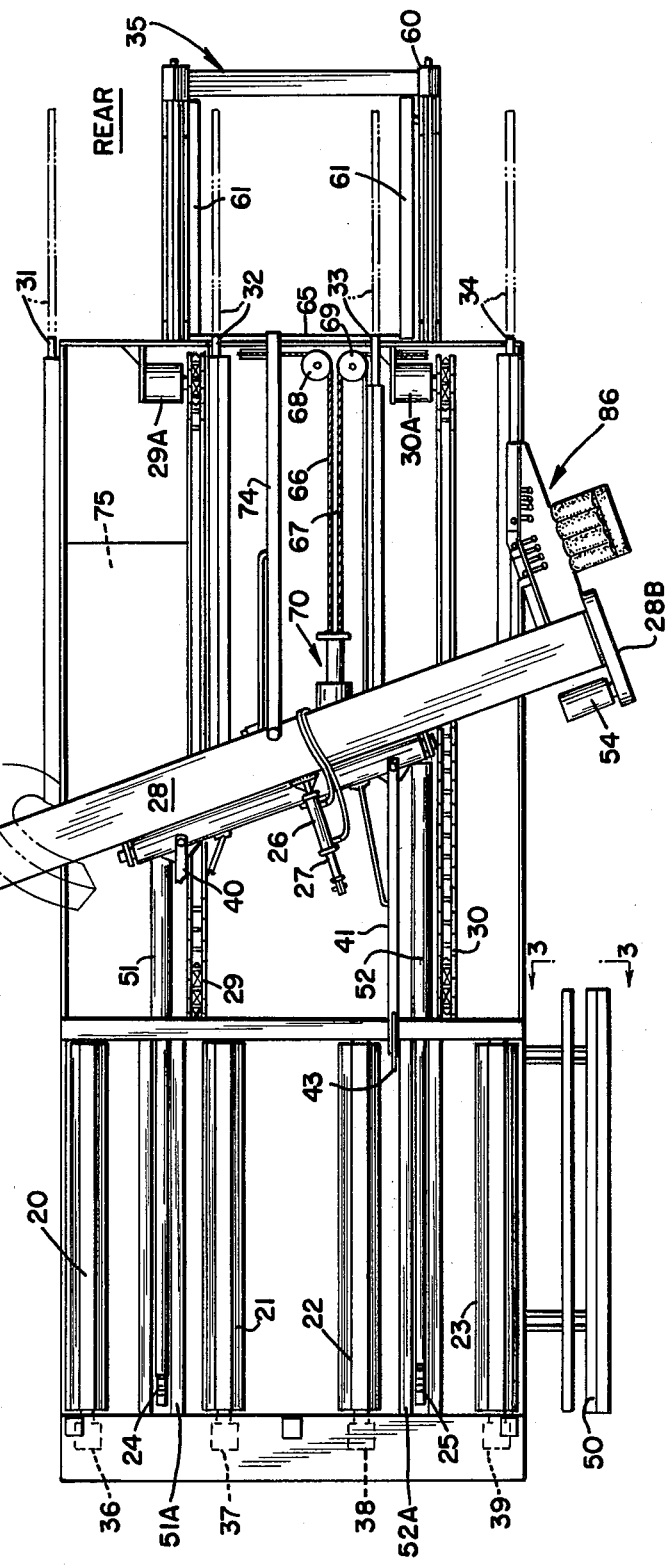
Fig.1
Fig.2

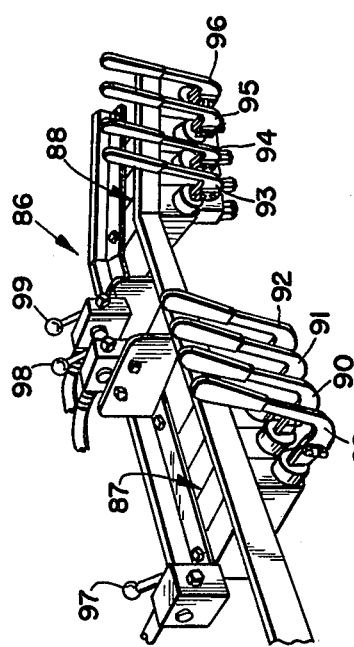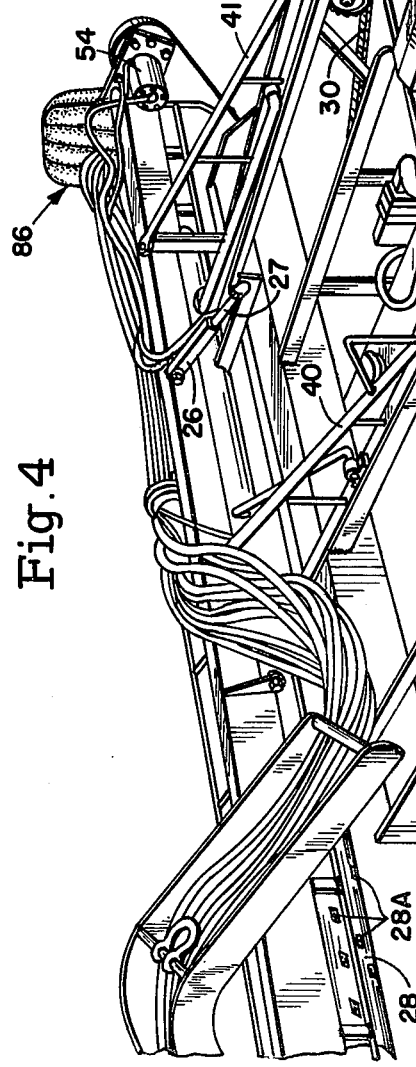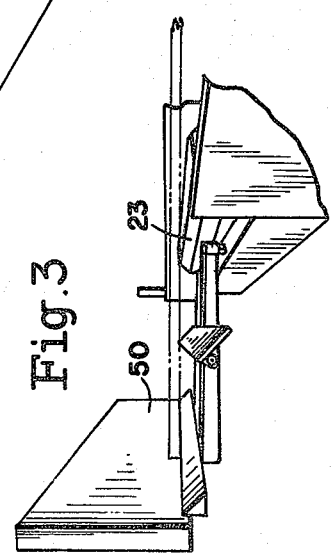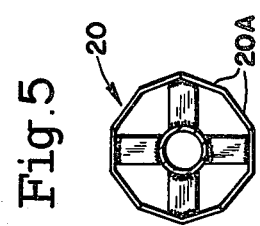

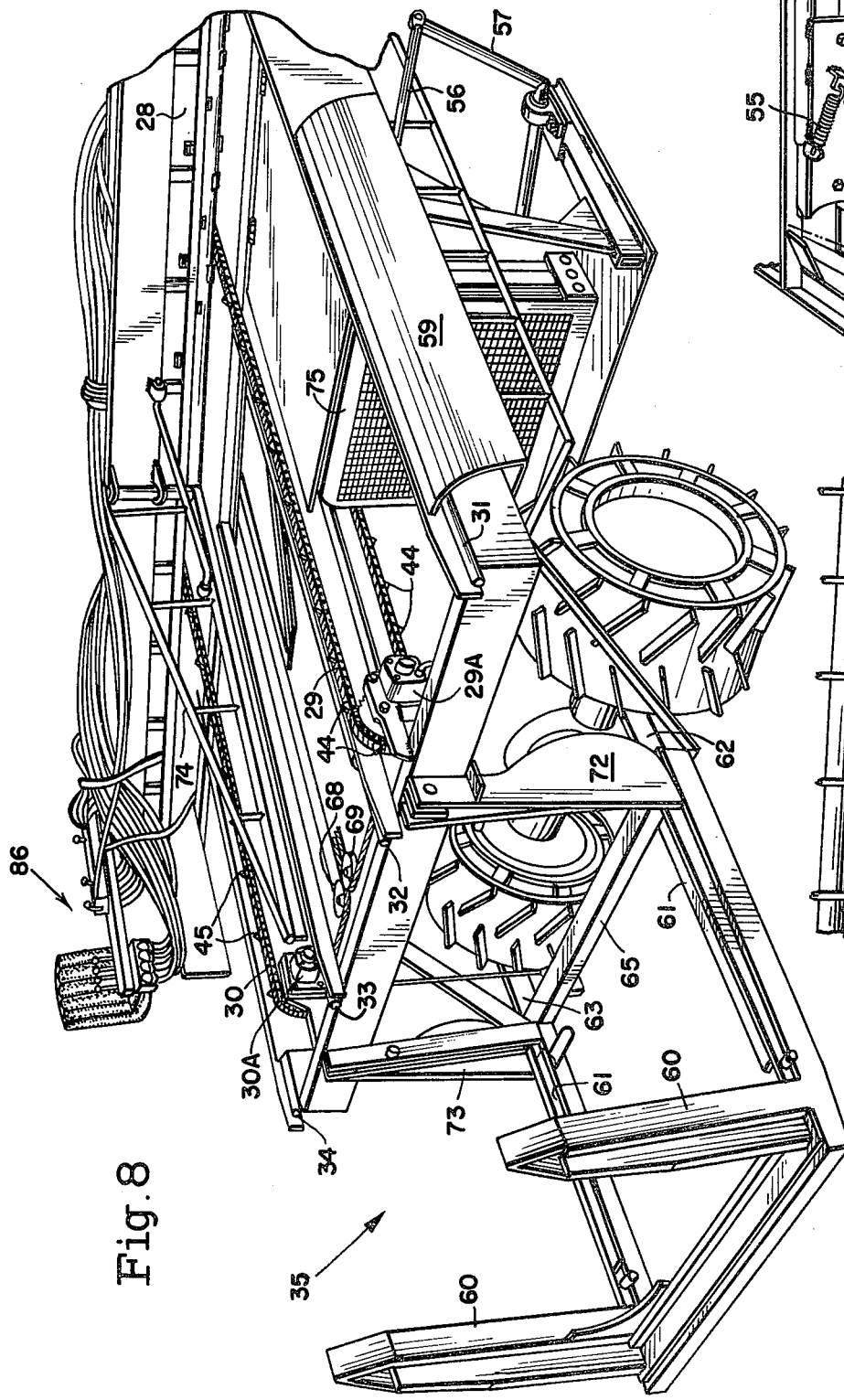
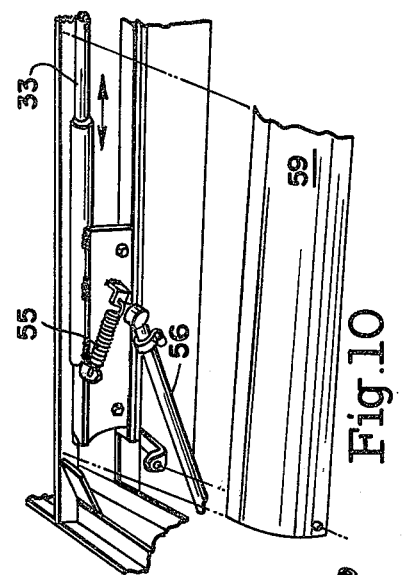
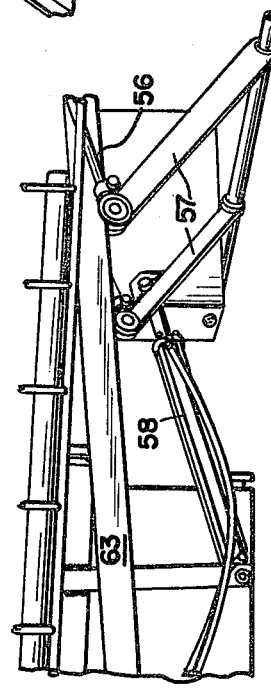
Fig. 8
Fig. 9
Fig. 10

APPARATUS FOR RECLAIMING NAILED BOARDS FROM A BOARD ROAD

TECHNICAL FIELD

My invention relates to a machine for reclaiming boards from a board road which boards have been previously removed from an in place board road and which have their nails extending from one side thereof and which boards must have these nails bent flat and moved rearwardly or beneath a nail bending roll so that a group of boards may be laid flat their protruding nails having been bent over flush with the surface of the board and the boards are stacked in bundles of 5 boards wide and 10 layers high for reuse. The apparatus is constructed to receive boards and move them through the processing step of the nail bending action with the major axis of the board at right angles to the passage of the board through the machine or rather to move the board edgewise through the machine and not longitudinally through the machine as shown in my prior U.S. Pat. No. 3,651,554. The boards are placed in substantial quantity transversely of the machine at its front end and advanced rearwardly through a station that assures that boards do not leap frog one over another but that a single horizontal plane of boards is maintained particularly at the nail bending station where the boards with the nails extending upwardly pass beneath a nail bending roll and are bent flush with the board and the board is then moved rearwardly past the nail bending roll and by endless chains is placed upon a transfer means which is a group of reciprocating rods which when loaded with boards edge to edge will be retracted and the boards will drop upon a board stacking and binding means for stacking boards having their nails bent in bundle groups for reuse.

BACKGROUND ART

Heretofore a limited number of apparatus have been devised to take large quantity of boards from a board road, that is boards having nails extending from one side thereof which nails must be bent, bending the nails and placing the boards in a stacked relationship for reuse. The closest art known to me is my own prior U.S. Pat. No. 3,651,554, granted March 28, 1972, wherein the boards are handled with their major axis parallel to the major axis of the machine or run longwise through a nail bending station.

Other patents found by me and considered prior to making this application are the A. Sommer U.S. Pat. No. 3,339,390; Newnes U.S. Pat. No. 3,760,959; the Schmitt U.S. Pat. No. 3,785,277; the Farrell et al. U.S. Pat. No. 3,855,917; the Lunden U.S. Pat. No. 3,860,128; and the Hebert U.S. Pat. No. 3,651,554.

DISCLOSURE OF THE INVENTION

This invention is directed to an apparatus for reclaiming boards from a board road which has been previously laid over a marsh land for such purposes as oil well drilling and laying pipe lines etc. Each board which has been removed from the board road will have five nails extending from one side thereof and these boards are 8 inches across by 2 inches high by 16 feet long and the handling of these boards in quantity lots has been very difficult in the past because of the nails extending therefrom. These nails must be bent flush with the board and the boards stacked in bundles five boards wide and ten board layers high for reuse in the building of future board roads. The boards of maximum efficiency must be passed through the machine edgewise of the board, that is with a plurality of boards transversely across the major axis of the machine and not as shown in the prior art by moving the board longitudinally with its major axis along the major axis of the machine since it takes too long to process a single board in such operation. The boards are first laid transversely across the board receiving rolls with their axis along the major axis of the rolls having their major axis along the major axis of the machine and receiving the boards with their major axis transversely of the major axis of th machine so that they will move edgewise through the machine. A means is provided coextensive with the board receiving rolls for advancing the boards edgewise rearwardly of the machine and this is a pivoted dog cylinder ram device which will permit the pivoted dog on forward thrust of the piston to pass beneath the boards and then on retraction of the ram within the cylinder the dog will stand upright and move the boards rearwardly toward a nail bending station. There is also provided a means in advance of the nail bending roll for assuring that the boards do not leap frog when passing longitudinally through the machine edgewise and that means will permit the operator to kick off any boards that are more than one board high. This will assure that only one level of boards will pass beneath the nail bending roll. The cylinder and ram actuated pivoted dogs move the boards on to a pair of endless chains which pass the boards through the apparatus to a rotary nail bending roll which is positioned diagonally across the machine with its rotary axis extending across at least four boards simultaneously and then the endless chains with upstanding lugs will continue to move the boards past the nail bending roll and on to a transfer means which is a group of reciprocating rods which when extended will receive five boards edgewise from the endless chain drive through the machine and when retracted the five boards will fall upon a board stacking device positioned to receive the boards from the reciprocating rod transfer means and to stack the boards having their nails bent flat in bundle groups for reuse.

BRIEF DESCRIPTION OF THE DRAWINGS

FIG. 1 is a side perspective view of the nail bending apparatus or machine constructed in accordance with the present invention;

FIG. 2 is a schematic top plan view of the apparatus of FIG. 1;

FIG. 3 is a rear perspective view taken on the lines 3—3 in FIG. 2;

FIG. 4 is a fragmentary perspective view of the board receiving rolls at the front end of the machine;

FIG. 5 is a vertical section through one of the board receiving rolls in the forward section of the machine;

FIG. 6 is a perspective view of the hydraulic lever operating stand of the machine operator taken from the rear of the operator's end of the stand;

FIG. 8 is a rear perspective view showing the board stacking device where the boards are stacked and bundled for reuse at the rear of the machine;

FIG. 9 is a fragmentary perspective view showing the hydraulic actuating mechanism for the transfer means which is positioned to receive the boards edgewise from the endless chain drive means at the rear of the machine for depositing the boards on to the board stacking station;

FIG. 10 is a further perspective view of the transfer means showing the upper portion of the actuating arms;

BEST MODE FOR CARRYING OUT THE INVENTION

Figure 7:
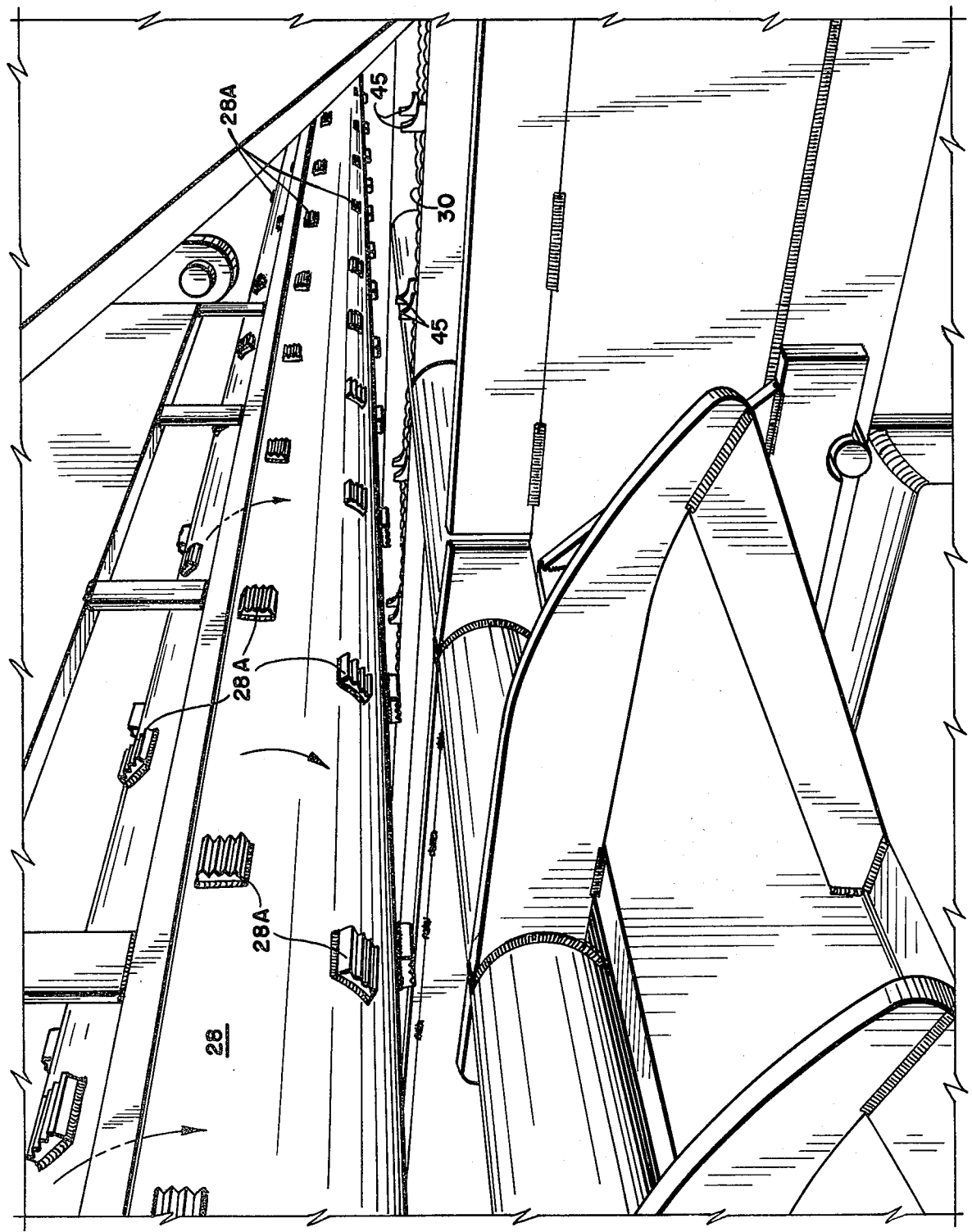
FIG. 7 is a fragmentary perspective view taken from the underside of the nail bending roll showing the relationship of the nail bending roll with the endless chain conveyor for moving boards through the machine.

Referring now to FIGS. 1 through 6, the machine for reclaiming boards from a board road the boards of which have nails extending from one side thereof and which must be bent flush with the boards stacked in bundles 5 boards wide and 10 board layers high for reuse comprises a first set of board receiving rolls 20, 21, 22, 23 with their axes along the major axis of the machine adapted to receive the boards with their major axis transversely of the machine on said rolls with the nails extending upwardly. There are means 24, 25 coextensive with said board receiving rolls for advancing the boards edgewise rearwardly of the machine. There are board leveling arms 40, 41 in advance of a nail bending roll 28 for maintaining a single vertical layer of boards.

Drive means in the form of endless chain drives 29, 30 are positioned to engage and move boards edgewise rearwardly from said board receiving rolls through the machine.

The rotary nail bending roll 28 is positioned at an angle less than 90° across the major axis of the machine with its rotary axis extending across at least four boards simultaneously.

A reciprocating rod transfer means 31, 32, 33, 34, are positioned to receive a group of 5 edgewise boards from said drive means 29, 30 for moving boards rearwardly of the machine.

A board stacking means 35 is positioned to receive boards from the rod transfer means 31, 32, 33, 34 to stack the boards having their nails bent flat in bundle groups for reuse.

The board receiving rolls 20, 21, 22, 23 have polygonal flat sides 20A as shown in FIG. 5 and are individually driven each by hydraulic motors 36, 37, 38 and 39.

Figure 11:
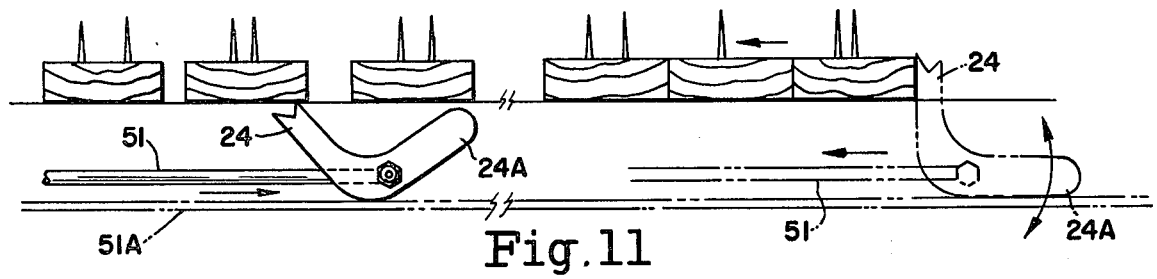
FIG. 11 is a schematic two position showing of the pivoted dog board transfer drive for moving boards rearwardly of the front receiving rolls.

The means advancing the boards edgewise longitudinally of the board receiving rolls are a pair of hydraulically ram actuated counter weighted pivoted dog carriers 24, 25 the pivoted dogs of which are adapted to pass beneath a layer of boards moving from the rear of the rolls to the front and to stand erect when moving from the front to the rear of the rolls to engage the edge of the forward most board and move a single horizontal layer of boards edge to edge rearwardly of the machine as best seen in FIG. 11.

The means in advance of the nail bending roll 28 for maintaining a single vertical layer of boards are a pair of arms 40, 41 having engaging lugs 42, 43 the arms being hydraulically elevatable and lowerable to kick off boards in excess of one horizontal layer.

The drive means positioned to engage and move the boards rearwardly from said board receiving rolls are the pair of independently variable speed drive endless chains 29, 30 which have lugs 44, 45 upstanding to engage and move the edgewise positioned boards received from the board receiving rolls.

The rotary nail bending roll 28 is a vertically floatable roll hydraulically driven and having nail engaging means 28A positioned about the periphery of the roll to engage and bend nails flat against the board and the axes of rotation of the roll is from 10° to 20° from a right angle to the major axis of the machine, as shown in FIGS. 7 and 8.

The board transfer means are a plurality of reciprocable board transfer rods 31, 32, 33, 34 positioned in their fully extended position to receive five boards from the endless drive chain means 29, 30 for moving boards edgewise rearwardly through the machine and which when retracted will drop the boards on the board stacking means 35, as best seen in FIGS. 8, 9 and 10.

Referring now to FIGS. 2, 3, 4 and 5, located at the front of the machine the board receiving rolls 20, 21, 22, 23 are rotatably mounted in the machine frame with their axes of rotation parallel to the major fore and aft axis of the machine and each roll is driven by a variable speed hydraulic motor 36, 37, 38, 39. The boards are fed in from the left in FIG. 4 and due to the rotation of the rolls the boards pass across the rolls and engage a board stop 50 which is removably carried by the machine frame and which may be removed for over the highway transport of the machine. The external geometric configuration of the rolls as shown in FIG. 5 are polygonal to engage the boards as they are fed with their major axes transversely of the machine and to move them across the rolls.

The means 24, 25 coextensive with the board receiving rolls for moving the boards edgewise rearwardly of the machine are best shown in FIGS. 2, 4 and 11, are in the form of pivoted dogs 24, 25 having counterweights 24A, 25A and which are driven by rams and cylinders 51, 52.

Referring to the lefthand end of FIG. 11 when the rams 51, 52 push the pivoted dogs 24, 25 forward each dog will rock as illustrated and when the direction of rams 51, 52 are reversed as shown at the righthand side of FIG. 11 the dogs 24, 25 will, under the weight of counterweight 24A, abut plate 51A, 52A so as to push the boards to the left or rearwardly of the machine as shown in FIG. 2.

The board leveling arms 40, 41 are best shown in FIG. 4. These arms 40, 41 are secured to a rockable sleeve carried on the nail bending roll housing and are elevatable hydraulically by cylinder and ram 26, 27 to present lugs 42, 43 for knocking back, forwardly of the machine, boards in excess of one horizontal layer prior to the boards engaging the lugs 44, 45 of the endless drive chains 29, 30.

The nail bending roll 28 is mounted in a housing 28B for free vertical floating rotation driven by a hydraulic motor 54. The roll 28 is positioned across the machine at an angle less than 90° to the major axis of the machine, in the order of a range from 10° to 20° less than a right angle to the major axis of the machine as best seen in FIGS. 1, 2 and 4. The roll 28 has nail bending teeth 28A spaced along and around the roll as shown in FIG. 7 in staggered relation to one another.

The drive means for the endless chains 29, 30 are two variable speed hydraulic motors 29A, 30A.

The transfer means positioned to receive the boards from the endless chain drives 29, 30, as best seen in FIGS. 8, 9 and 10 are four transfer rods 31, 32, 33 and 34 which are spring loaded at 55 in a trolley movable back and forth, see arrow in FIG. 10, under the drive of a rod 56 connected to arm 57 which is driven by cylinder and ram 58. All four transfer rod drives are identical and are driven by a single cylinder and ram, and each has a cover 59 to keep foreign matter away from the mechanism. These four transfer rods are slightly below the endless chain drives 29, 30 which will deposit 5 boards on the rods when the rods are in their fully extended position which will overlie the stacking means 35, and upon withdrawl of the rods from beneath the boards they will be deposited upon the board stacking receiver 35.

As best seen in FIGS. 1 and 8, the stacking receiver has a frame 60 having a leveler 61 and a pair of elevator arms 62, 63 which are pivoted to the machine frame forwardly at 64, FIG. 1, and which extend through the machine to the rear of the frame 60. A crosshead 65 is connected between the arms 62, 63 to which are secured two cables 66, 67 which pass about sheaves 68, 69 which are connected to a cylinder ram unit 70 for raising and lowering of the stacking table being the arms 62, 63 and a pivoted board support 71. A pair of counterweights 72, 73 keep the boards aligned in the frame 60.

THE POWER SYSTEM

Figure 12:
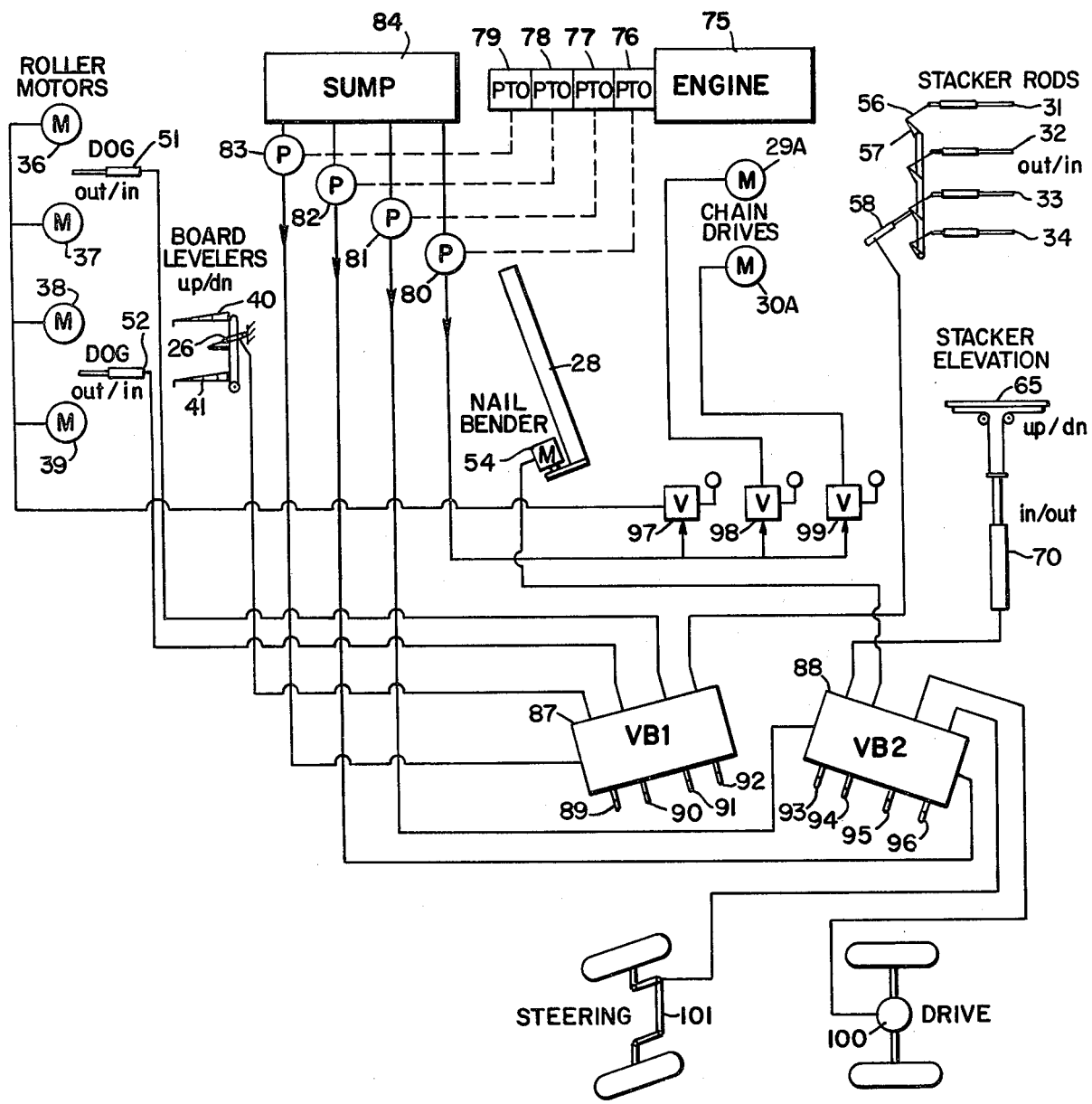
FIG. 12 is a schematic of the hydraulic system employed to operate the various stations of this nail bending apparatus for reclaiming boards from a board road.

Referring now to FIG. 12, the machine is powered with a diesel engine 75 which drives four power take-offs 76, 77, 78, 79 which drive four hydraulic pumps 80, 81, 82, 83 each connected to a hydraulic sump 84 and each under valve controls at the machine operator's console 86, shown in FIG. 6, where there are two valve banks 87, 88 for controlling: the board leveler at 89; the forward roll board transfer dog rams 51, 52 at 90, 91, transfer rod ram 58 at 92; the nail bending roll motor 54 at 94; the vehicle propulsion motor 100 at 95; and the vehicle steering ram 101 at 96. Valve 97 controls the front board receiving rolls 20, 21, 22, 23; while valves 98, 99 controls the right and left endless chain drive motors 29A and 30A. The vehicle propulsion is by conventional hydraulic drive 100 and the steering by a hydraulic steering ram 101. The lever 93 controls the cylinder 70 for raising and lowering the board bundle stacking table elevator 65.

IN OPERATION

Referring now to FIGS. 2 through 5, the four front board receiving rolls 20, 21, 22, 23 receive the boards, these rollers rotate at about 25 rpm. They are about 8½ inches in diameter and all four turn at the same time, and rotate at the same speed. They move the boards across the machine against the board stop or bulkhead 50. When the front rolls 20, 21, 22, 23 are filled with boards along their length, the boards being edgewise against one another, the pivoted dog units 24, 25 each being attached to an 8 foot cylinder and ram 51, 52 one on each side of the machine. The pivoted dogs being counterweighted at 24A, 25A so that as they move toward the front of the machine, as best seen in FIG. 11, they will pass beneath the horizontal boards and when they travel in the other direction they will automatically stand up and engage the edge of a board. They are designed to be the thickness of the board above the rollers so that they will actually just catch one thickness of boards at a time, as shown in FIG. 11. They are independent, and can be operated either side or both sides at the same time, engaging the boards from the rollers edgeways to move them towards the board leveler 40, 41 and then on to the endless chains 29, 30.

There are two beams pivoted to the transverse roller housing 28B, which keep more than one level of boards from passing the rollers to the endless chains and these levelers are hydraulically operated from the operator's console 86. If there is one board on top of another he may then push it off and as the two hydraulic 8 foot rams 52, 51 pull the boards to the rear the top board comes up against this board leveler and lugs 42, 43 then pushes the board back on to the rollers so that only one board level is advancing to the endless chains.

The two endless chains 29, 30, one on the right and one on the left, having board engaging lugs 44, 45 and each is independently driven by a hydraulic motor 29A, 30A.

The boards will then pass beneath the nail bending roll 28 which is 16 ft. 9 inches long, weighs 860 pounds, and has board nail engaging teeth 28A of a real hard material and as the board arrives at the nail bending roll 28 the nail bender will engage the board as the board passes under the roller; the roller has a floating type mount that adjusts to the thickness and height of the board passing therebeneath. The roller 28 can come down to within about 2 inches of the endless chains but it can float up 3 inches, and adjust to the dfifferent thicknesses of boards that pass therebeneath, being driven by the motor 54, which can be rotated very very slowly or fast, this motor 54 is controlled from the operator's console 86 at the desired speed.

The nail bending roll 28 is not at right angles to the major axis of the machine, it is diagonal of the machine at about a 10 to 20 degree angle with the driver's console 86 at the rearmost end of this angle of orientation which was selected for several reason, there are 5 nails in each board. As shown it bends one nail at a time plus the roller is actually on about four boards instead of one which maintains the boards flat and keeps them from turning with the roller and of course another reason is that it worked out well to have the operator's console where he can visually see everything from the rear to the front of this machine and then be at the maximum distance from loading the boards at the front end.

Referring now to the rear of the machine, rearwardly of the nail bending roll 28 there is a boom 74 which is not elevatable like the two board leveler booms 40, 41 on the front of the nail bending roll mechanism which is mounted so that it can be swung back against the nail bending roll carrier housing for transportation purposes. This boom 74 functions as the boards come out from under the nail bending roll 28, and the boards are still on the endless chains 29, 30 to keep the boards from wanting to crawl on the top of each other. It is adjusted so that it has only its own weight on the board which is all that is necessary to keep a slight pressure on the boards to control them and keep them from flipping over.

Referring now to FIG. 8, at the rear of the machine there are the two endless chains 29, 30, each being driven by a hydraulic motor 29A, 30A, they are completely independent of each other and are controlled by controls 98, 99 to control the pressure to the pump 80 and where the rpm to the pump can be varied.

Referring now to FIGS. 8, 9 and 10, at rear of the machine the four transfer rods 31, 32, 33, 34, two in the central area, and one on each outboard side, these are the board stackers and when they are extended out, all four of them, being connected to a common rock shaft which is actuated by one ram which operates all four rods and they are controlled by the hydraulic control valve 92 at the operator's console 86. When the transfer rods are exteneded out, five boards at a time will be deposited on these transfer rods by the endless chains 29, 30 and when five boards are on the rods the operator reverses the direction of rod travel which withdraws the rods from beneath the boards dropping them on the stacking elevator 35 which when elevated is approximately 2 inches under the rods 31, 32, 33 and 34.

The board stacker 35 is controlled by two long bars 62, 63 one on each side of the machine which extends all the way to the rear of the machine and extend 41 inches further, they are elevatable approximately 30 inches distance from the loading position of the boards to the bottom which assures enough room to accommodate ten board tiers high, they are hydraulically controlled from the operator's console 86 by valve 93. After receiving five boards from the transfer rods which have been retracted the stacker elevator is then lowered about 2 inches and the transfer rods are extended over the stacker and five more boards placed thereon, then the transfer rods are retracted back in and the five boards falls on the first layer or last layer of boards placed on the stack. This is continued until there are 10 tiers of boards, 5 boards wide, 50 board bundles are the assembly units the machine is designed to collect.

What is claimed:

1. A machine for reclaiming boards from a board road the boards of which have nails extending from one side thereof and which must be bent flush with the board and the boards stacked in bundles 5 boards wide and 10 board layers high for reuse comprising
   (a) a mobile hydraulically self-propelled steerable vehicular frame,
   (b) a first set of board receiving rolls mounted on the leading end of said vehicular frame with their axes along the major axis of the machine adapted to receive the boards with their major axes transversely of the machine on said rolls with the nails extending upwardly,
   (c) pivoted dog pushers co-extensive with said board receiving rolls one set of dogs to each side of the centerline of the vehicular frame for moving and maintaining transverse alignment of the boards edgewise with their major axis normal to the vehicular frame on said board receiving rolls for moving said boards rearwardly,
   (d) means carried by said vehicular frame for maintaining a single vertical layer of boards,
   (e) endless chain drive means positioned to engage and move said boards edgewise rearwardly from said board receiving rolls through the machine,
   (f) a rotary nail bending roll positioned at an angle less than 90° across the major axes of the machine with its rotary axis extending across at least four boards simultaneously,
   (g) reciprocating rod transfer means positioned to receive a group of edgewise boards from said drive means for moving boards rearwardly of the machine,
   (h) and board stacking means rearwardly of said reciprocating rod transfer means positioned to receive boards from said transfer means and to stack boards having their nails bent flat in bundle groups for reuse.

2. A machine for reclaiming boards as claimed in claim 1 wherein said board receiving rolls have polygonal flat sides and are individually driven each by a hydraulic motor.

3. A machine for reclaiming boards as claimed in claim 1 wherein said means for advancing the boards edgewise transversely of the board receiving rolls are a pair of hydraulically ram actuated counter weighted pivoted dog carriers the pivoted dogs of which are adapted to pass beneath a layer of boards moving from the rear of the rolls to the front and to stand erect when moving from the front to the rear of the rolls to engage the edge of the forward most board and move a single horizontal layer of boards edge to edge rearwardly of the machine.

4. A machine for reclaiming boards as claimed in claim 1 wherein the means for maintaining a single vertical layer of boards are a pair of arms having engaging lugs, said arms being hydraulically elevatable and lowerable to kick off boards in excess of one horizontal layer.

5. A machine for reclaiming boards as claimed in claim 1 wherein said drive means positioned to engage and move boards rearwardly from said board receiving rolls are a pair of independently variable speed driven endless chains having lugs upstanding to engage and move the edgewise positioned boards received from said board receving rolls.

6. A machine for reclaiming boards as claimed in claim 1 wherein said rotary nail bending roll is a vertically floatable roll hydraulically driven and having nail engaging means positioned about the periphery of the roll to engage and bend nails flat against the board and the axes of rotation of the roll is from 10° to 20° from a right angle to the major axis of the machine.

7. A machine for reclaiming boards as claimed in claim 1 wherein said reciprocative rod transfer means are a plurality of reciprocable board transfer rods positioned in their fully extended position to receive five boards from the drive means for moving boards edgewise rearwardly through the machine and which when retracted will drop the boards on said board stacking means.

* * * * *